US011021240B2

(12) United States Patent
Lee et al.

(10) Patent No.: US 11,021,240 B2
(45) Date of Patent: Jun. 1, 2021

(54) UNMANNED AERIAL VEHICLE

(71) Applicant: Samsung Electronics Co., Ltd, Suwon-si (KR)

(72) Inventors: Wu Seong Lee, Asan-si (KR); Bae Seok Lim, Suwon-si (KR); Youn Hyung Choi, Suwon-si (KR); Seung Nyun Kim, Incheon (KR); Yong Sang Yun, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 603 days.

(21) Appl. No.: 15/849,254

(22) Filed: Dec. 20, 2017

(65) Prior Publication Data

US 2018/0170533 A1   Jun. 21, 2018

(30) Foreign Application Priority Data

Dec. 20, 2016   (KR) .................... 10-2016-0174370

(51) Int. Cl.
*B64C 27/00* (2006.01)
*B64C 39/02* (2006.01)
(Continued)

(52) U.S. Cl.
CPC .............. *B64C 27/006* (2013.01); *B64C 1/08* (2013.01); *B64C 39/024* (2013.01); *B64D 47/08* (2013.01);
(Continued)

(58) Field of Classification Search
CPC ......... B64C 27/006; B64C 1/08; B64C 1/061; B64C 2201/108; B64C 2201/027
(Continued)

(56) References Cited

U.S. PATENT DOCUMENTS 7,273,195 B1 * 9/2007 Golliher ................. A63H 27/12
244/17.11
9,457,901 B2 * 10/2016 Bertrand ................. B64C 27/20
(Continued)

FOREIGN PATENT DOCUMENTS

DE     202019001761 U1 *  7/2019  ............... B64C 1/30
EP        3239048 A1 * 11/2017  ........... B64C 39/024
(Continued)

OTHER PUBLICATIONS

International Search Report dated Apr. 3, 2018 in connection with International Patent Application No. PCT/KR2017/015089.

*Primary Examiner* — Christopher P Ellis

(57) ABSTRACT

An unmanned aerial vehicle (UAV) is provided. The UAV includes a first guard grill, a second guard grill configured to be removably combined with the first guard grill and form an external structure and an inner space of the UAV with the first guard grill, a housing configured to include a central portion located in the center of the inner space and embed a processor and a navigation system, one or more propelling elements configured to be located the inner space and be disposed around the central portion, and a plurality of motor assemblies configured to be located in the inner space and drive the propelling elements while being electrically connected with the processor. When viewed from the outside of the external structure, the propelling elements are partially covered by at least one of the first guard grill or the second guard grill.

10 Claims, 14 Drawing Sheets

(51) Int. Cl.
*B64D 47/08* (2006.01)
*B64C 1/08* (2006.01)

(52) U.S. Cl.
CPC .. *B64C 2201/027* (2013.01); *B64C 2201/108* (2013.01); *B64C 2201/127* (2013.01); *B64C 2201/141* (2013.01)

(58) Field of Classification Search
USPC ....................................................... 244/17.15
See application file for complete search history.

(56) References Cited

U.S. PATENT DOCUMENTS

| | | | | |
|---|---|---|---|---|
| 9,868,431 | B1 * | 1/2018 | Ladislao | B60V 1/11 |
| 10,063,328 | B1 * | 8/2018 | Brinkoetter | H04B 17/18 |
| 2016/0137293 | A1 * | 5/2016 | Santangelo | B64C 37/00 244/50 |
| 2016/0200415 | A1 | 7/2016 | Cooper | |
| 2016/0229530 | A1 * | 8/2016 | Welsh | A63H 27/12 |
| 2016/0280359 | A1 * | 9/2016 | Semke | B64C 27/10 |
| 2017/0144757 | A1 * | 5/2017 | Hall | H04L 12/2803 |
| 2017/0291697 | A1 * | 10/2017 | Kornatowski | B64C 27/20 |
| 2017/0374277 | A1 * | 12/2017 | Dobashi | H04N 5/23299 |
| 2018/0002035 | A1 * | 1/2018 | Neely | H04N 13/296 |
| 2018/0022453 | A1 * | 1/2018 | Tian | B64D 47/08 244/17.23 |
| 2018/0059660 | A1 * | 3/2018 | Heatzig | G06K 9/00664 |
| 2018/0155024 | A1 * | 6/2018 | Lee | B64C 39/024 |
| 2018/0162529 | A1 * | 6/2018 | Klein | B64D 1/02 |
| 2018/0257775 | A1 * | 9/2018 | Baek | B64C 27/20 |
| 2019/0002093 | A1 * | 1/2019 | Muramatsu | B64B 1/60 |
| 2019/0092457 | A1 * | 3/2019 | Ohta | B64C 1/30 |
| 2019/0094885 | A1 * | 3/2019 | Matsuda | B64C 39/024 |
| 2019/0100296 | A1 * | 4/2019 | Aldana Lopez | G05D 1/042 |
| 2019/0206266 | A1 * | 7/2019 | Taveira | G05D 1/0202 |
| 2019/0217948 | A1 * | 7/2019 | Pounds | B64C 11/00 |
| 2019/0225327 | A1 * | 7/2019 | Kidakarn | B64C 27/006 |
| 2019/0359328 | A1 * | 11/2019 | Clarke | B64C 27/10 |

FOREIGN PATENT DOCUMENTS

| | | | | |
|---|---|---|---|---|
| EP | 3450310 A1 * | 3/2019 | | B64C 27/20 |
| GB | 2528489 A * | 1/2016 | | B64C 39/028 |
| KR | 10-2006-0110471 A | 10/2006 | | |
| KR | 10-2012-0136797 A | 12/2012 | | |
| WO | 2006/112578 A1 | 10/2006 | | |
| WO | 2016/112124 A2 | 7/2016 | | |

* cited by examiner

UNMANNED AERIAL VEHICLE

CROSS-REFERENCE TO RELATED APPLICATION(S)

The present application is related to and claims priority to Korean Patent Application No. 10-2016-0174370 filed Dec. 20, 2016, the entire disclosure of which is hereby incorporated by reference.

TECHNICAL FIELD

The present disclosure relates to unmanned aerial vehicles (UAVs).

BACKGROUND

Recently, UAVs, such as drones, have been actively developed. A UAV may be wirelessly connected with a remote controller to be remotely controlled. The UAV may be used for industry or leisure, such as aerial image capture using cameras or crop-dusting.

The UAV may include a housing (or a main body) where a control module, a battery, or the like is embedded and a propeller exposed to an outer side of the housing and may perform a variety of flight as well as hovering. The UAV may be classified as a quadcopter, a hexacopter, an octocopter, or the like according to the number of propellers. For example, the quadcopter, the hexacopter, and the octocopter may refer to a UAV, the number of propellers of which is 4, a UAV, the number of propellers of which is 6, and a UAV, the number of propellers of which is 8, respectively.

SUMMARY

A UAV may be provided in a form where a propeller is exposed to the outside. If the UAV collides with a user or an object, he or she is hurt or the object is damaged by the propeller which rotates at a high speed. Thus, the UAV may include a guard frame, located at an outer side of the propeller, which surrounds the propeller to prevent the propeller from being in contact with an external object. However, the UAV may deteriorate in flight performance due to an increase in weight due to the provided guard frame, and a flight time may be reduced.

Aspects of the present disclosure are to address at least the above-mentioned problems and/or disadvantages and to provide at least the advantages described below. To address the above-discussed deficiencies, it is a primary object to provide a structure of a guard frame for ensuring flight performance by ensuring safety of a user or device.

In accordance with an aspect of the present disclosure, an unmanned aerial vehicle (UAV) includes a first guard grill, a second guard grill configured to be removably combined with the first guard grill and form an external structure and an inner space of the UAV with the first guard grill, a housing configured to include a central portion located in the center of the inner space and embed a processor and a navigation system, a plurality of propelling elements configured to be located the inner space and be disposed around the central portion, and a plurality of motor assemblies configured to be located in the inner space and drive the propelling elements while being electrically connected with the processor. When viewed from the outside of the external structure, the propelling elements are partially covered by at least one of the first guard grill or the second guard grill.

In accordance with another aspect of the present disclosure, an unmanned aerial vehicle (UAV) includes a guard frame configured to form the appearance of the UAV and have a space formed at an inner side of the guard frame, a housing configured to be located in the space, the housing in which at least one of a processor, a memory, a communication circuit, or a battery is received, a plurality of motors configured to be located in the space and be electrically connected with the processor, and a plurality of propellers configured to be located in the space and be driven by the plurality of motors. The guard frame includes a first frame configured to be located in a central region of the guard frame, the first frame in which the housing is received, a second frame configured to be located at an outer side of the first frame and surround the first frame, a plurality of third frames configured to be located between the first frame and the second frame, the plurality of third frames in which the plurality of motors are received, at least one fourth frame configured to connect the first frame with one of the plurality of third frames, and at least one fifth frame configured to connect the second frame with one of the plurality of third frames. At least one of the fourth frame and the fifth frame is extended from one point of an outer surface of one frame among the plurality of third frames while forming a specified angle with a first straight line which virtually connects a central point of the one frame with the one point of the outer surface.

According to embodiments disclosed in the present disclosure, as a region where a motor is received is formed in a guard frame, since an additional frame for connecting the motor to a main frame is unnecessary, a weight of a UAV may be reduced and flight control performance may be enhanced due to the reduction of the weight of the UAV.

Further, according to embodiments disclosed in the present disclosure, a frame of at least part of the guard frame offsets a force generated by the motor to prevent the guard frame from being transformed.

In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
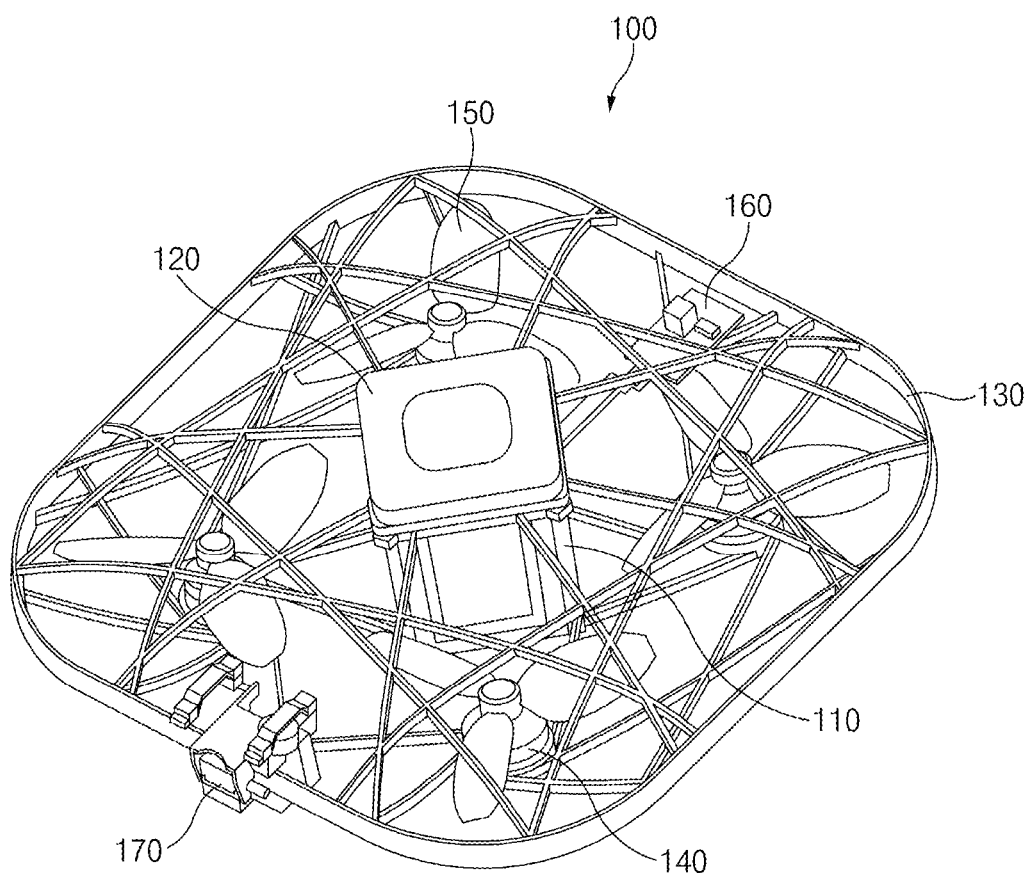
FIG. 1 illustrates a front elevational perspective view of an unmanned aerial vehicle (UAV) according to various embodiments.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to,"

"adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ or PlayStation™) an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

Figure 2:
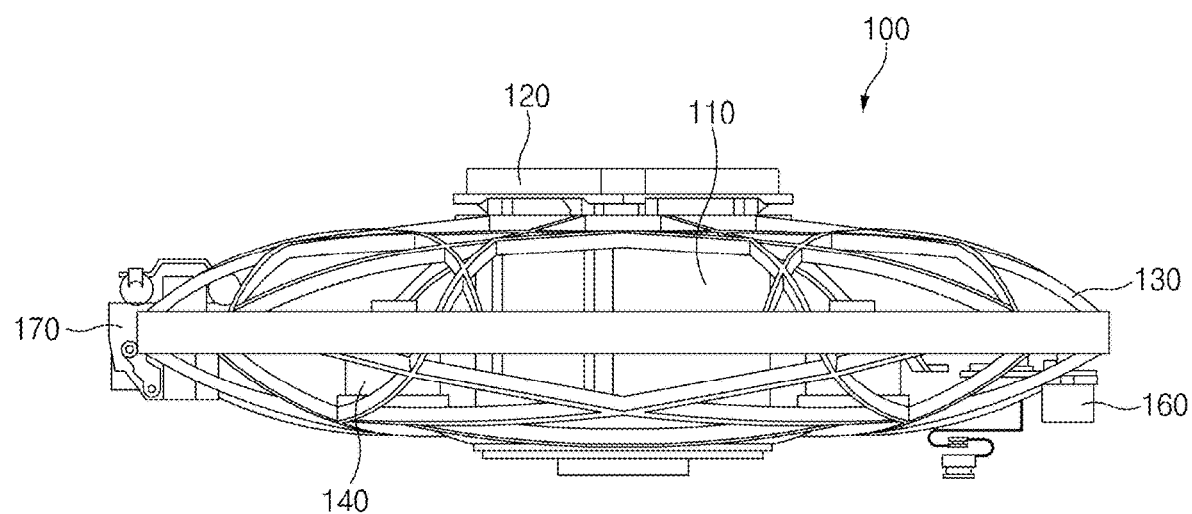
FIG. 2 illustrates a side view of a UAV according to various embodiments.
Figure 3:
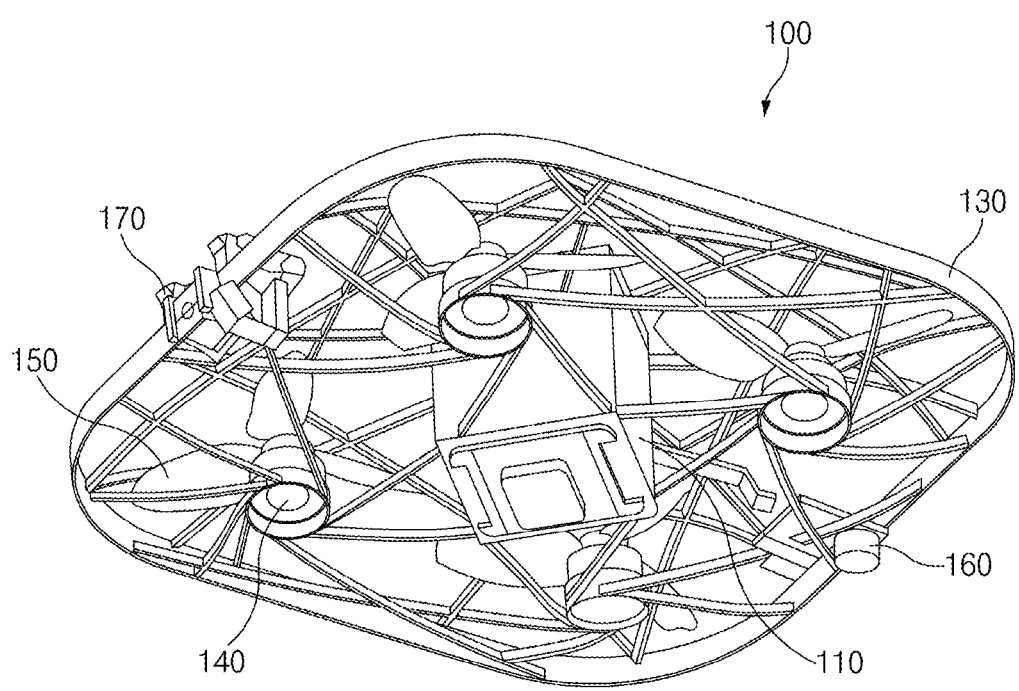
FIG. 3 illustrates a rear elevational perspective view of a UAV according to an embodiment.
Figure 4:
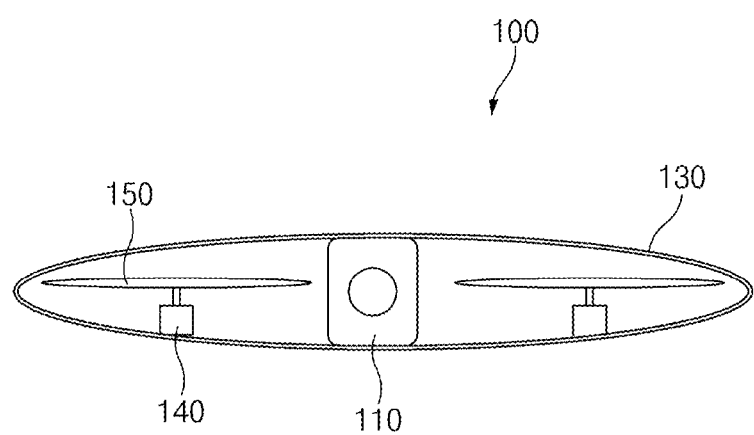
FIG. 4 illustrates a side cross-section view of a UAV according to various embodiments.

FIG. 1 illustrates a front elevational perspective view of an unmanned aerial vehicle (UAV) according to various embodiments. FIG. 2 illustrates a side view of a UAV according to various embodiments. FIG. 3 illustrates a rear elevational perspective view of a UAV according to various embodiments. FIG. 4 illustrates a side cross-section view of a UAV according to various embodiments.

Referring to FIGS. 1 to 4, a UAV 100 may include a housing 110, a guard frame (or a guard grill) 130, a plurality of motors 140, one or more propellers 150, a sensor module 160, and at least one camera 170. However, the configuration of the UAV 100 is not limited thereto. According to various embodiments, the UAV 100 may fail to include at least one of the above-mentioned elements and may further include at least one other element(s).

The housing 110 may provide a space such that various electronic components included in the UAV 100 are received at an inner side. The housing 110 may include, for example, a first surface (e.g., an upper surface), a second surface (e.g., a lower surface), a side surface which surrounds at least part of a space between the first surface and the second surface. The first surface and the second surface may be provided in substantially the same shape as each other. For example, if the first surface is provided as a quadrangle, the second surface may be provided as the quadrangle. The housing 110 may be provided in the form of, for example, an overall polygon (e.g., an overall quadrangle) and may be rounded at an edge portion. However, the shape of the housing 110 is not limited thereto. According to various embodiments, the shape of the housing 110 may be provided in a different way according to the number of the propellers 150, the number of the cameras 170, or the like.

A module for controlling flight of the UAV 100, a module for controlling the camera 170, or the like may be located at an inner side or a lateral side of the housing 110. For example, at least one processor, a memory, a communication circuit, a battery, or the like may be located at an inner side of the housing 110. For another example, a driving device, for example, a driving circuit board, an element for mounting a battery (or a battery pack), or the like may be located at an inner side or a lateral side of the housing 110. Further, the housing 110 may include a contact point (e.g., a contact, a connector, or the like) which may be electrically connected with the battery (or the battery pack).

The housing 110 may be provided in the form of a cube, the inside of which is empty. For example, the housing 110 may include four housing sidewalls. As two of the four housing sidewalls are located in the form of sharing an edge with each other, the housing 110 may be provided in the form of a square pole. An upper end of the housing may be opened, and various electronic components may be inserted and received from an upper side of the housing 110 to an inner side of the housing 110. A lower end of the housing 110 may be opened, or the housing 110 may further include a bottom portion which closes the lower end of the housing 110. However, the shape of the housing 110 is not limited thereto. The housing 110 may be provided in various forms where a module for controlling flight of the UAV 100, a module for controlling the camera 170, or the like may be located an inner side or a lateral side of the housing 110.

The UAV 100 may include a net-type support (e.g., the guard grill 130). The net-type support may include a plurality of lower supports for supporting the housing 110, the motor 140 on which the propeller 150 is mounted, the camera 170, the sensor module 160, or the like, a plurality of upper supports located on an upper portion of the plurality of lower supports, and a main frame in which the plurality of lower supports and the plurality of upper supports are fixed.

The main frame may be provided in the form of, for example, an overall polygon (e.g., an overall quadrangle) and may be rounded at an edge portion. A portion which is relatively wide in area in the main frame may be located in a longitudinal direction. The camera 170, the sensor module 160, and the like may be received in the main frame. At least part of a signal wire associated with driving the camera 170, the sensor module 160, and the like may be located at least one side of the main frame.

The plurality of lower supports may include, for example, an element support for fixing the motor 140 or the housing 110 and lower net supports for fixing the element support to the main frame and being located in the form of a net. The element support may include, for example, a motor support in which the motors 140 are received and a lower housing support in which the housing 110 is received. The plurality of upper supports may include, for example, an upper housing support for being fixed to the main frame and upper net supports located in the form of a net between the upper housing support and the main frame. The supports may be provided in a form where an upper surface is narrow in width and where a sidewall surface is relatively wide. Such a structure may minimize air friction with supports while the propeller 150 moves air located on the top to the bottom, during rotation of the propeller 150. A signal wire associated with driving the motor 140, a signal wire associated with controlling the camera 170, and a signal wire associated with controlling the sensor module 160 may be provided as a pattern in at least some of the lower net supports, or a separately provided cable may be fixed to at least the some of the lower net supports.

As described above, in manufacturing a small or micro drone, the UAV 100 may provide a form where a plurality of rigid circuit boards connected by a flexible board is mounted in the form of a cube and where a battery is inserted into an inner side of the housing 110. The UAV 100 may enhance deterioration in flight efficiency by interference in the propeller 150 and a body and may enhance control performance by centering a weight of a fuselage.

The UAV 100 may include a battery pack and at least four case sidewalls located in a first direction. The UAV 100 may include a case including an opening, formed by the case sidewalls, used to insert the battery pack, the housing 110 into which the case is inserted, a circuit board located on at least one of sidewalls of the housing 110, the motor 140 driven by control of the circuit board, the propeller 150 connected to the motor 140, the camera 170 for capturing an image by control of the circuit board, the sensor module 160 for performing a specified sensing operation by control of the circuit board, and a net-type protection structure for fixing the housing 110 and the motor 140 and surrounding the housing 110 and the propeller 150.

The processor may execute an arithmetic operation or data processing associated with control and/or communication of at least one other element(s) of the UAV 100. For example, the processor may store sensing information obtained by the sensor module 160 in the memory. For another example, the processor may store an image captured by the camera 170 in the memory. For another example, the processor may control driving of the motor 140 for flight of the UAV 100. The processor may include one or more of a central processing unit (CPU), an application processor (AP), or a communication processor (CP).

The memory may store a command or data associated with at least one other element of the UAV 100. The memory may store software and/or a program. For another example, the memory may store sensing information obtained by the sensor module 160 or an image obtained by the camera 170. Further, the memory may store a command or data for controlling the motor 140. The memory may include a volatile and/or non-volatile memory.

The communication circuit may establish communication between the UAV 100 and an external electronic device. For example, the communication module may be connected to a network through wireless communication or wired communication to communicate with the external electronic device.

The battery may supply power to elements included in the UAV 100. For example, the battery may supply power for driving the motor 140. For another example, the battery may supply power for driving the camera 170. The battery may be provided to be integrated with the UAV 100 and may be removably provided.

The housing 110 may be combined with a cover 120. For example, the housing 110 may be provided in a state where one surface is opened and may be combined such that the cover 120 covers the one surface. In some embodiments, the cover 120 may be configured as part of a battery pack. For example, the housing 110 may be opened at one surface and may have a space in which the battery packet may be received at an inner side. The battery pack may be inserted into an inner side from the opened surface of the housing 110, and a surface of the battery pack, corresponding to an opposite side of the inserted direction, may perform a function of the cover 120.

The guard frame 130 may form the appearance of the UAV 100, and a space may be provided such that at least some of the elements of the UAV 100 are located at an inner side of the guard frame 130. For example, the housing 110 may be located in a central region of the space provided at the inner side of the guard frame 130, and the plurality of motors 140 may be located in a symmetric form relative to the housing 110. Further, the sensor module 160 or the camera 170 may be located in a periphery region of the guard frame 130.

The guard frame 130 may be integrated with each other or may be configured with a plurality of frames. For example, the guard frame 130 may be configured to be divided into an upper frame (or a first guard grill) which surrounds an upper portion of the UAV 100 and a lower frame (or a second guard grill) which surrounds a lower portion of the UAV 100. In this case, the upper frame and the lower frame may be coupled to each other. A space where at least some of the elements of the UAV 100 may be located may be formed between the upper frame and the lower frame when the upper frame and the lower frame are coupled to each other.

The motor 140 may rotate a rotary shaft of the motor 140 if power is supplied to the motor 140. The propeller 150 of the UAV 100 may rotate due to the rotation of the rotary shaft. In the drawing shown, is exemplified as the motor 140 and the propeller 150 is respectively configured with four motors and four propellers. However, the number of the motors 140 and the number of the propellers 150 are not limited thereto. Herein, it may be preferable that the motor 140 and the propeller 150 are located in a symmetric form for weight balance of the UAV 100.

The sensor module 160 may measure a physical quantity or may detect an operation state of the UAV 100 and may convert the measured or detected information into an electric signal. The sensor module 160 may include, for example, a gyro sensor, an atmospheric pressure sensor, a geomagnetic sensor, an acceleration sensor, a proximity sensor, an ultrasonic sensor, an optical sensor, or the like. The sensor module 160 may further include a control circuit for controlling at least one or more sensors included therein.

The camera 170 may capture a still image and a moving image. The camera 170 may include an imaging device. The imaging device may include at least one of, for example, a lens for receiving image light of a subject and imaging the received image light as an image, a diaphragm for adjusting an amount of light passing through the lens, a shutter for performing a function of opening and closing the diaphragm such that an image sensor is exposed during a predetermined time by light passing through the lens, the image sensor for receiving the image imaged on the lens as an optical signal, or an internal memory. The internal memory may temporarily store a captured image.

Figure 5:
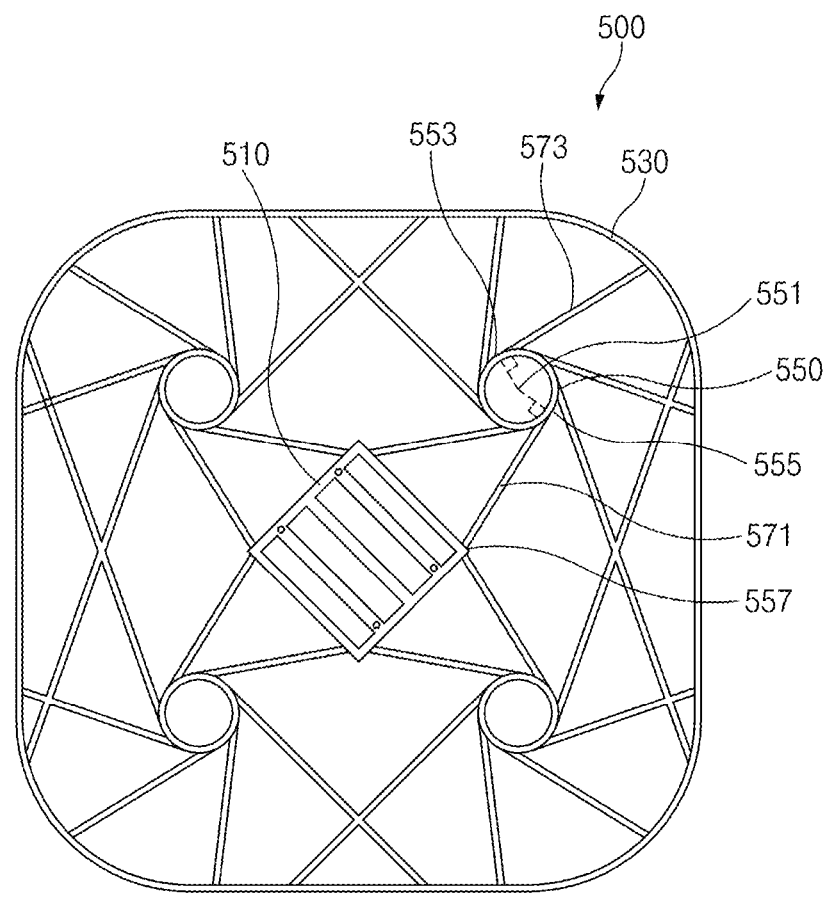
FIG. 5 illustrates a plane view of a guard frame according to various embodiments.
Figure 6:
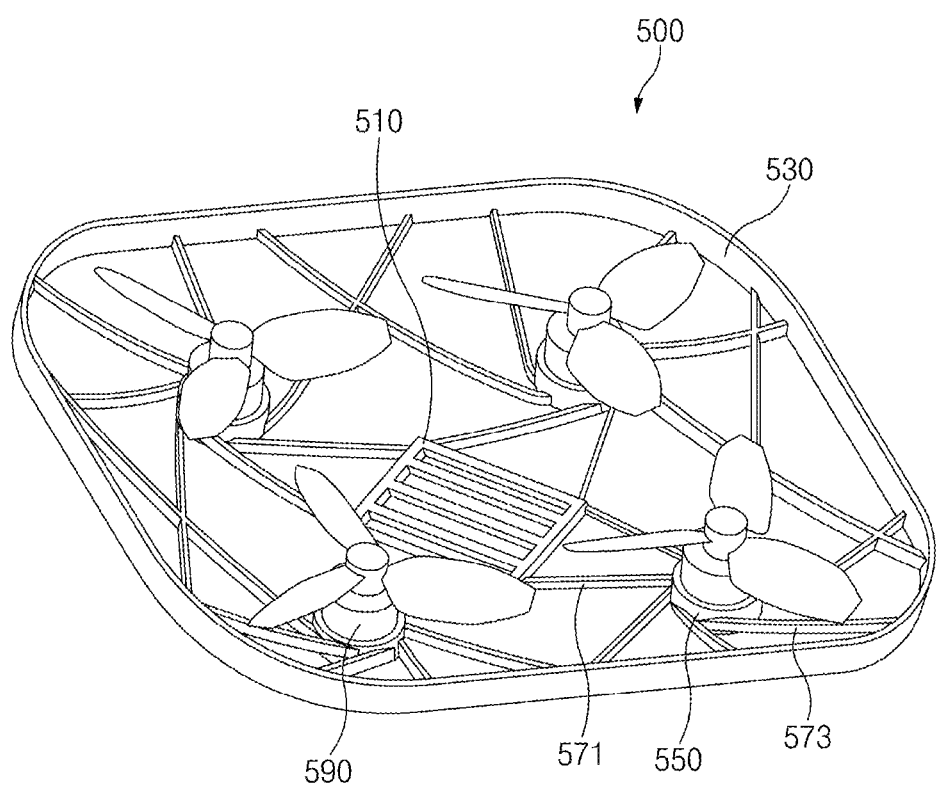
FIG. 6 illustrates a front elevational perspective view of a guard frame according to various embodiments.

FIG. 5 illustrates a plane view of a guard frame according to various embodiments. FIG. 6 illustrates a front elevational perspective view of a guard frame according to various embodiments.

Referring to FIGS. 5 and 6, a guard frame 500 (e.g., a guard frame 130) may be configured to be divided into an upper frame which surrounds an upper portion of a UAV (e.g., a UAV 100) and a lower frame which surrounds a lower portion of the UAV. Alternatively, the guard frame 500 may be provided such that the upper frame is integrated with the lower frame. The drawing shows the lower frame of the guard frame 500. However, the upper frame may be provided to be substantially the same as the lower frame shown. Hereinafter, a description will be given of the guard frame 500 without dividing the upper frame and the lower frame.

The guard frame 500 may include a first frame 510 in which a housing (e.g., a housing 110) is received, a second frame 530 which is located at an outer side of the first frame 510 and surrounds the first frame 510, and a plurality of third frames 550 which are located between the first frame 510 and the second frame 530, in which a motor 590 (e.g., a motor 140) is received. The first frame 510 may be located in a central region of the guard frame 500 and may be configured as a relatively larger area than one surface of the housing such that the housing is received. As shown in the drawings, the first frame 510 may have a quadrangular periphery and may include at least one sub-frame in which at least one side and at least the other side of the periphery are connected with each other. However, the shape of the first frame 510 is not limited thereto. The first frame 510 may have any shape if the first frame 510 has a structure in which the housing is receivable.

The second frame 530 may be provided as a shape which surrounds the first frame at an outer side of the first frame 510. The second frame 530 may be provided as substantially a circle or quadrangle. As shown in the drawings, the second frame 530 may be formed in a form where an edge region is a curve.

The third frame 550 may be provided as a shape corresponding to a bottom surface of the motor 590 such that the motor 590 is received. For example, the third frame 550 may be provided as a circle which is substantially the same as the bottom surface of the motor 590. For another example, the third frame 550 may have a circular periphery, and an inner region of the periphery may be provided as an empty space. In this case, the motor 590 may be inserted into the space, and the motor 590 may be fixed by a hanger member (e.g., a hook) or the like provided at an inner side of the periphery. However, the shape of the third frame 550 is not limited thereto. The third frame 550 may have any shape if the third frame 550 has a structure where the motor 590 is receivable.

The third frame 550 may be connected with the first frame 510 through at least one fourth frame 571. Further, the third frame 550 may connected with the second frame 530 through at least one fifth frame 573. For example, the fourth frame 571 and the fifth frame 573 may play a role in being respectively connected to the first frame 510 and the second frame 530 and supporting the third frame 550.

The fourth frame 571 and the fifth frame 573 may be provided in the shape of a straight bar or rod. The fourth frame 571 may be extended in a tangent direction of an outer side of the third frame 550 from one point of the outer side of the third frame 550 to be connected to the first frame 510. For another example, the fourth frame 571 may form a specified angle (e.g., 60 degrees to 120 degrees) with a line which virtually connects a central point 551 of the third frame 550 with a point 555 to which the fourth frame 571 is extended. For another example, a length of the fourth frame 571 (e.g., a length between a point 557 where the fourth frame 571 is connected with the first frame 510 and points 555 where the fourth frame 571 is connected with the third frame 550) may be shorter than a length from the central point 551 of the third frame 550 to the point 557 where the fourth frame 571 is connected with the first frame 510.

In some embodiments, if the first frame 510 is provided as a polygon (e.g., a quadrangle), the fourth frame 571 may be connected to an edge region of the first frame 510. If the first frame 510 is provided as a circle, the fourth frame 571 may form a tangent at a point connected with an outer side of the first frame 510. The fifth frame 573 may be extended in the tangent direction of the outer side of the third frame 550 from the other side of the outer side of the third frame 550 to be connected to the second frame 530. For example, a line (e.g., a normal line) connected from the central point 551 of the third frame 550 to a point 553 to which the fourth frame 571 or the fifth frame 573 is extended may form a right angle with the fourth frame 571 or the fifth frame 573.

The fourth frame 571 and the fifth frame 573 may be extended in turn from points spaced apart from each other at a specified interval on an outer side of the third frame 550. Further, when extended from the points, the fourth frame 571 and the fifth frame 573 may be extended in a predetermined way in a clockwise or counterclockwise direction. In some embodiments, a direction where the fourth frame 571 and the fifth frame 573 are extended may vary according to a rotation direction of the motor 590 received in the third frame (or a rotation direction of a propeller). For example, if the rotation direction of the motor 590 is the clockwise direction, the fourth frame 571 and the fifth frame 573 may be extended in the counterclockwise direction. If the rotation direction of the motor 590 is the counterclockwise direction, the fourth frame 571 and the fifth frame 573 may be extended in the clockwise direction. As described above, as the direction in which the fourth frame 571 and the fifth frame 573 are extended is formed to be opposite to the rotation direction of the motor 590, the fourth frame 571 and the fifth frame 573 may offset a force generated by the motor 590. Thus, the guard frame 500 may be prevented from being transformed by rotation of the motor 590. However, the direction in which the fourth frame 571 and the fifth frame 573 are extended may fail to be specified as only one direction. According to various embodiments, the fourth frame 571 or the fifth frame 573 may be extended in the clockwise or counterclockwise direction.

Figure 7:
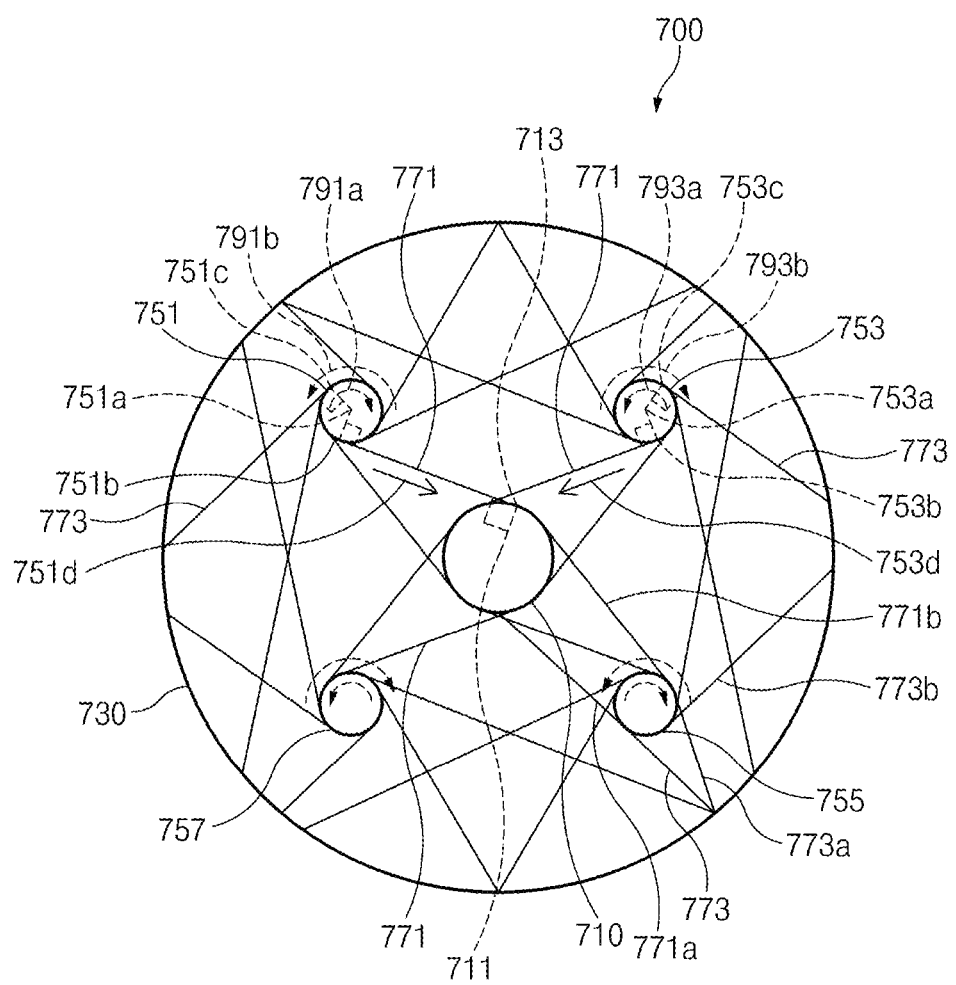
FIG. 7 illustrates a drawing of a guard frame of a first form according to various embodiments.

FIG. 7 illustrates a drawing of a guard frame of a first form according to various embodiments.

Referring to FIG. 7, a guard frame 700 (e.g., a guard frame 130 or 500) may include a first frame 710, located in a central region, in which a housing (e.g., a housing 110) is received, a second frame 730 which is located at an outer side of the first frame 710 and surrounds the first frame 710, and a plurality of third frames 751, 753, 755, and 757 which are located between the first frame 710 and the second frame 730, each in which a motor (e.g., a motor 140 or 590) is received.

The first frame 710 may be provided as a circle. For example, the first frame 710 may be provided as a circle having a similar diameter to a diameter of an upper end (or a lower end) of the housing such that the housing (e.g., the housing which is cylindrical or rounded at an edge), the upper end and the lower end of which are provided as substantially the circle, is received.

The second frame 730 may be provided as a circle. However, the shape of the second frame 730 is not limited thereto. According to various embodiments, the second frame 730 may be provided as a polygon (e.g., a quadrangle) and may be rounded at an edge portion.

Each of the third frames 751, 753, 755, and 757 may be provided as a shape corresponding to a lower end of the motor such that the motor is received. For example, each of the third frames 751, 753, 755, and 757 may be provided as a circle.

The third frames 751, 753, 755, and 757 may be connected with the first frame 710 through at least one fourth frame 771 and may be connected with the second frame 730 through at least one fifth frame 773. Each of the fourth frame 771 and the fifth frame 773 may be provided in the form of a straight bar or rod.

There may be various forms where the fourth frame 771 and the fifth frame 773 are connected with the first frame 710, the second frame 730, or each of the third frames 751, 753, 755, and 757. For example, the fourth frame 771 may be extended in a tangent direction of an outer side of each of the third frames 751, 753, 755, and 757 from one point 751b or 753b of the outer side of each of the third frames 751, 753, 755, and 757 to be connected to the first frame 710. For example, a line connected from a central point 751a or 753a of each of the third frames 751, 753, 755, and 757 to a point 751b or 753b to which the fourth frame 771 is extended may form a right angle with the fourth frame 771. The angel formed with the fourth frame 771 by the line connected from the central point 751a or 753a of each of the third frames 751, 753, 755, and 757 to the point 751b or 753b to which the fourth frame 771 is extended is not limited thereto. According to various embodiments, the angle may be 60 degrees to 120 degrees. Further, a length of the fourth frame 771, for example, a length between points where the fourth frames 771 is connected with the first frame 710 and each of the third frames 751, 753, 755, and 757 may be shorter than a length from the central point 751a or 753a of each of the third frames 751, 753, 755, and 757 to a point where the fourth frame 771 is connected with the first frame 710. According to various embodiments, the fifth frame 773 may be extended in the tangent direction of the outer side of each of the third frames 751, 753, 755, and 757 from the other point 751c or 753c of the outer side of each of the third frames 751, 753, 755, and 757 to be connected to the second frame 730. For example, a line connected from the central point 751a or 753a of each of the third frames 751, 753, 755, and 757 to a point 751c or 753c to which the fifth frame 773 is extended may form a right angle with the fifth frame 773. The angel formed with the fifth frame 773 by the line connected from the central point 751a or 753a of each of the third frames 751, 753, 755, and 757 to the point 751c or 753c to which the fifth frame 773 is extended is not limited thereto. According to various embodiments, the angle may be 60 degrees to 120 degrees. Further, a length of the fifth frame 773, for example, a length between points where the fifth frame 773 is connected with the second frame 730 and each of the third frames 751, 753, 755, and 757 may be shorter than a length from the central point 751a or 753a of each of the third frames 751, 753, 755, and 757 to a point where the fifth frame 773 is connected with the second frame 730.

The fourth frame 771 may form a tangent at a point 713 connected with an outer side of the first frame 710. For example, a line connected from a central point 711 of the first frame 710 to the point 713 where the fourth frame 771 is connected may form a right angle with the fourth frame 771. The angle formed with the fourth frame 771 by the line connected from the central point 711 of the first frame 710 to the point 713 where the fourth frame 771 is connected is not limited thereto. According to various embodiments, the angle may be 60 degrees to 120 degrees.

The fourth frame 771 and the fifth frame 773 may be extended in turn from points spaced apart from each other at a specified interval on the outer side of each of the third frames 751, 753, 755, and 757. For example, when the outer side of each of the third frames 751, 753, 755, and 757 is viewed as substantially one circle, points to which the fourth frame 771 and the fifth frame 773 are extended may be located to be spaced apart from each other at a specified interval on a circumference. In other words, the first point 75ab or 753b located on the circumference may be located to be spaced apart from the second point 751c or 753c by a specified distance.

A direction where each of the fourth frame 771 and the fifth frame 773 is extended from the outer side of each of the third frames 751, 753, 755, and 757 may vary according to a rotation direction of a motor received in each of the third frames 751, 753, 755, and 757. For example, if the rotation direction of the motor is a clockwise direction 791a, the fourth frame 771 and the fifth frame 773 may be extended in a counterclockwise direction 791b. If the rotation direction of the motor is a counterclockwise direction 793a, the fourth frame 771 and the fifth frame 773 may be extended in a clockwise direction 793b. For example, as shown in FIG. 7, if the rotation direction of the motor is the clockwise direction 791a, the fourth frame 771 extended from the one point 751b of the outer side of the third frame 751 may be extended in a left direction 751d of a virtual first line while forming a right angle with the virtual first line which connects the central point 751a of the third frame 751 with the point 751b to which the fourth frame 771 is extended. Further, if the rotation direction of the motor is the counterclockwise direction 793a, the fourth frame 771 extended from the one point 753b of the outer side of the third frame 751 may be extended in a right direction 753d of a virtual second line while forming a right angle with the virtual second line which connects the central point 753a of the third frame 751 with the point 753b to which the fourth frame 771 is extended.

The rotation of the motor received in each of the third frames 751, 753, 755, and 757 may be the same as a rotation direction of a motor of an orthogonal direction and may be different from a rotation direction of a motor of a transverse direction or a longitudinal direction. For example, a rotation direction of a first motor received in the third frame 751 located in a left upper end of the guard frame 700 may be the same as a rotation direction of a third motor received in the third frame 755 located in a right lower end of the guard frame 700. A rotation direction of a second motor received in the third frame 753 located in a right upper end of the guard frame 700 may be the same as a rotation direction of a four motor received in the third frame 757 located in a left lower end of the guard frame 700. Further, the rotation direction of each of the first motor and the third motor may be opposite to the rotation direction of each of the second motor and the fourth motor. For example, the first motor and the third motor may rotate in the clockwise direction 791a, and the second motor and the fourth motor may rotate in the counterclockwise direction 793a.

The fourth frame 771 and the fifth frame 773 may be extended in the counterclockwise direction 791b and the clockwise direction 793b from the outer side of each of the third frames 751, 753, 755, and 757 to be connected with the first frame 710 and the second frame 730. For example, one fourth frame 771a may be formed in a clockwise direction at a first point of the outer side of the third frame 755 and the other fourth frame 771b may be formed in a counterclockwise direction at a second point of the outer side of the third frame 755 to be connected with an outer side of the first frame 710. Further, one fifth frame 773a may be formed in a clockwise direction at a third point of the outer side of the third frame 755 and the other fifth frame 773b may be formed in a counterclockwise direction at a fourth point of the outer side of the third frame 755 to be connected with an inner side of the second frame 730.

Figure 8:
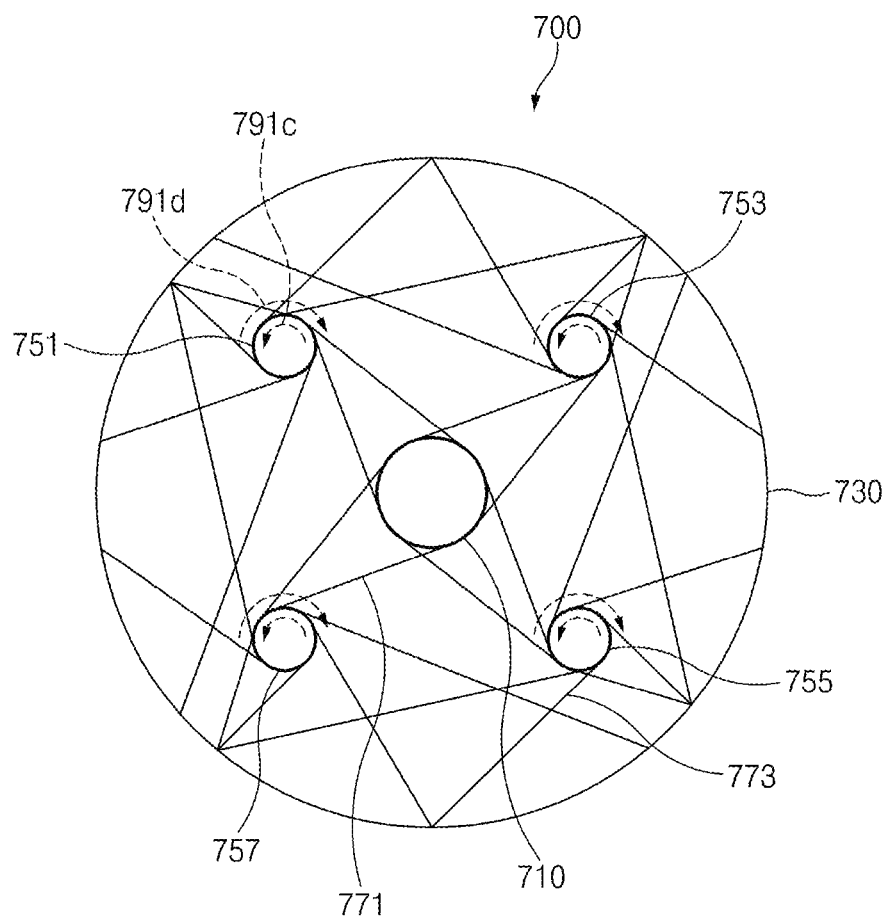
FIG. 8 illustrates a drawing of a guard frame of a second form according to various embodiments.

FIG. 8 illustrates a drawing of a guard frame of a second form according to various embodiments.

Referring to FIG. 8, all of rotation directions of motors received in third frames 751, 753, 755, and 757 may be the same as each other. For example, as shown in FIG. 8, all the motors may rotate in a counterclockwise direction 791c. In this case, each of a fourth frame 771 and a fifth frame 773 may be extended in a clockwise direction from an outer side of each of the third frames 751, 753, 755, and 757. In some embodiments, each of the fourth frame 771 and the fifth frame 773 may be extended in a counterclockwise direction from the outer side of each of the third frames 751, 753, 755, and 757. The rotation direction of each of the motors is not limited to only the counterclockwise direction 791c. In some embodiments, all the motors may rotate in a clockwise direction.

Figure 9:
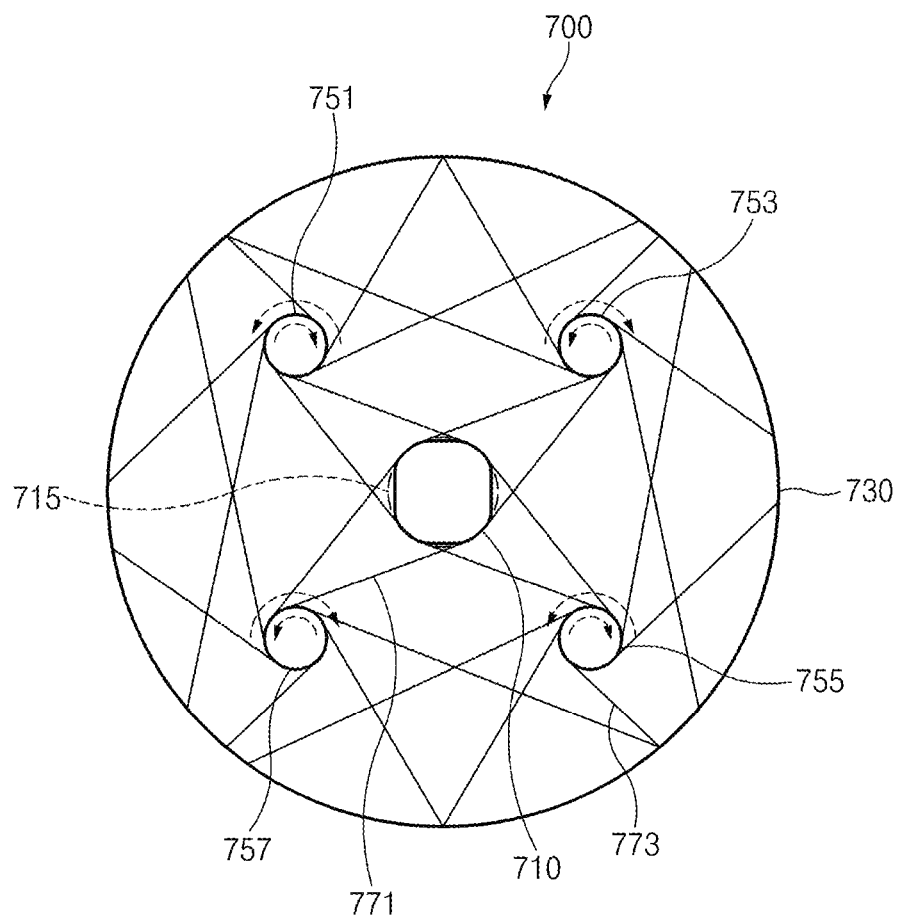
FIG. 9 illustrates a drawing of a guard frame of a third form according to various embodiments.

FIG. 9 illustrates a drawing of a guard frame of a third form according to various embodiments.

Referring to FIG. 9, a first frame 710 may be configured as a polygon (e.g., a quadrangle). Further, the first frame 710 may be configured in the form of a curve at an edge region (e.g., may be rounded at an edge portion). In this case, a fourth frame 771 may form a tangent with a circumscribed circle 715 of the first frame 710. For example, the fourth frame 771 may be connected with an edge region of the first frame 710 while forming the tangent with the virtual circumscribed circle 715 of the first frame 710.

According to various embodiments, the fourth frame 771 may form a specified angle (e.g., 60 degrees to 120 degrees) with a line which virtually connects a central point of each of third frames 751, 753, 755, and 757 with a point to which the fourth frame 771 is extended. For another example, a length of the fourth frame 771 (e.g., a length between a point where the fourth frame 771 is virtually connected with the circumscribed circle 715 of the first frame and points where the fourth frame 771 is connected with the third frames 751, 753, 755, and 757) may be shorter than a length from the central point of each of the third frames 751, 753, 755, and 757 to a point where the fourth frame 771 is virtually connected with the circumscribed circle 715 of the first frame 710.

Figure 10:
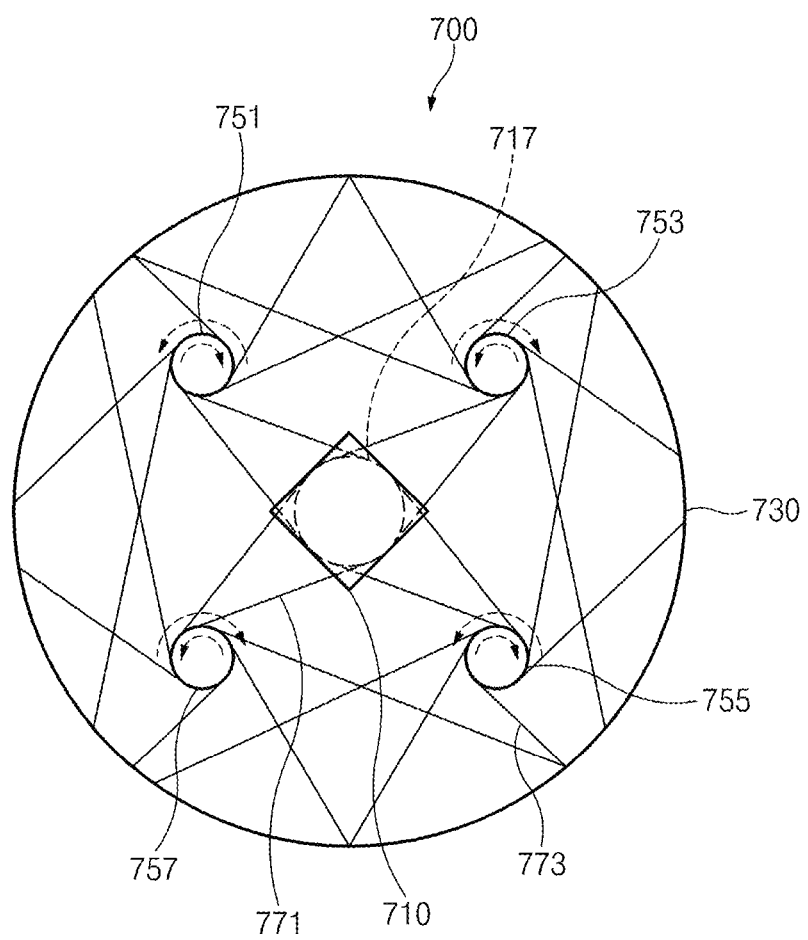
FIG. 10 illustrates a drawing of a guard frame of a fourth form according to various embodiments.

FIG. 10 illustrates a drawing of a guard frame of a fourth form according to various embodiments.

Referring to FIG. 10, a first frame 710 may be configured as a polygon (e.g., a quadrangle). Further, a fourth frame 771 may be connected to an edge region of the first frame 710. The fourth frame 771 may form a tangent with an inscribed circle 717 of the first frame 710. For example, the fourth frame 771 may be connected with the edge region of the first frame 710 while forming the tangent with the virtual inscribed circle 717 of the first frame 710.

According to various embodiments, the fourth frame 771 may form a specified angle (e.g., 60 degrees to 120 degrees) with a line which virtually connects a central point of each of third frames 751, 753, 755, and 757 with a point to which the fourth frame 771 is extended. For another example, a length of the fourth frame 771 (e.g., a length between a point where the fourth frame 771 is virtually connected with the inscribed circle 717 of the first frame 710 and points where the fourth frame 771 is connected with the third frames 751, 753, 755, and 757) may be shorter than a length from the central point of each of the third frames 751, 753, 755, and 757 to a point where the fourth frame 771 is virtually connected with the inscribed circle 717 of the first frame 710.

Figure 11:
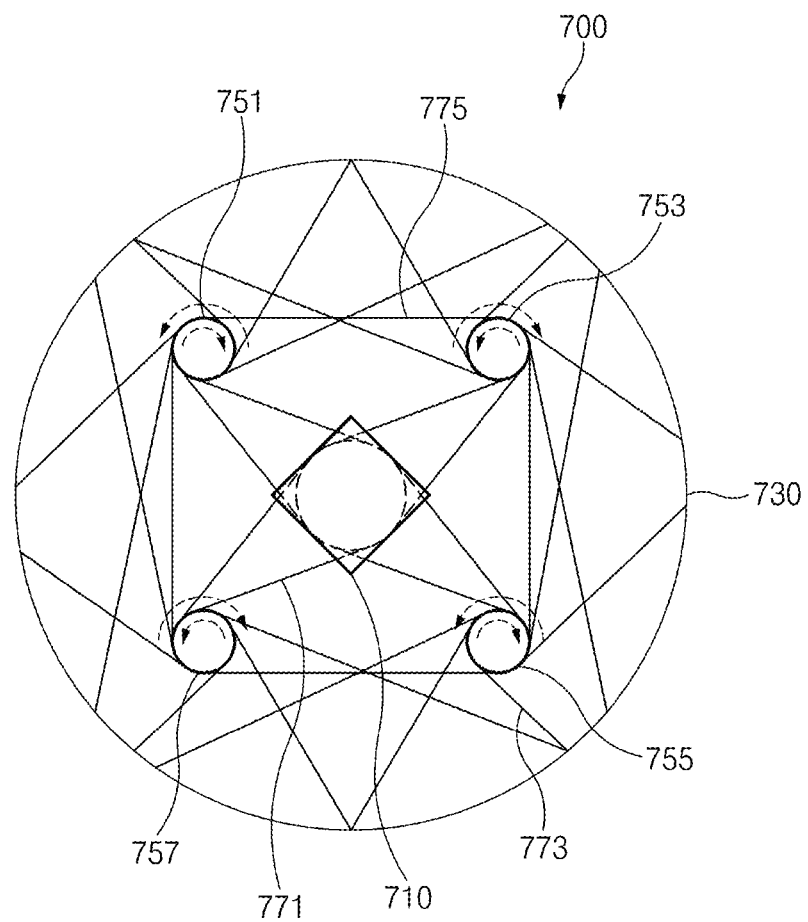
FIG. 11 illustrates a drawing of a guard frame of a fifth form according to various embodiments.

FIG. 11 illustrates a drawing of a guard frame of a fifth form according to various embodiments.

Referring to FIG. 11, adjacent third frames 751, 753, 755, and 757 may be connected with one another through a sixth frame 775. For example, the third frame 751 located at a left upper end of the guard frame 700 may be connected with the third frame 753 located at a right upper end of the guard frame 700 and the third frame 757 located at a left lower end of the guard frame 700 through the sixth frame 775. Further, the third frame 755 located at a right lower end of the guard frame 700 may be connected with the third frame 753 located at the right upper end and the third frame 757 located at the left lower end through the sixth frame 775.

The sixth frame 775 may be provided in the form of a straight bar or rod. The sixth frame 775 may form a tangent at a point where the sixth frame 775 is connected with each of the third frames 751, 753, 755, and 757.

According to various embodiments, the sixth frame 775 may form a specified angle (e.g., 60 degrees to 120 degrees) with a line which virtually connects a central point of each of third frames 751, 753, 755, and 757 with a point to which the sixth frame 775 is extended.

Figure 12:
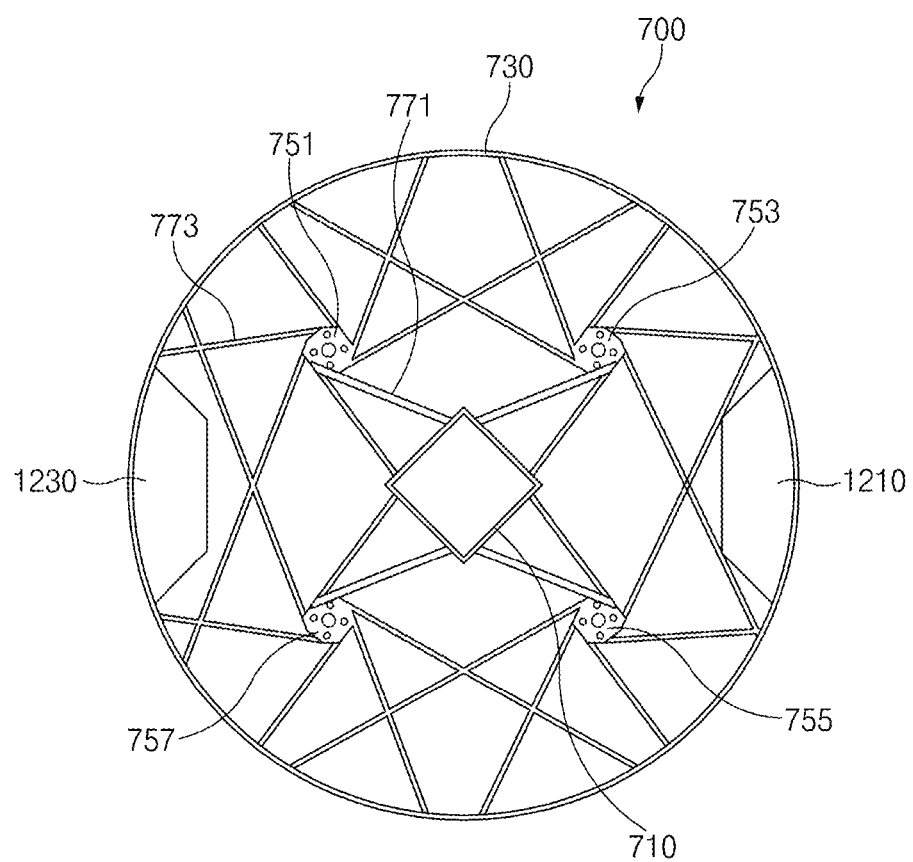
FIG. 12 illustrates a drawing of a guard frame of a sixth form according to various embodiments.

FIG. 12 illustrates a drawing of a guard frame of a sixth form according to various embodiments.

Referring to FIG. 12, a guard frame 700 may include a frame for locating an electrical object of a sensor module (e.g., a sensor module 160) or a camera (e.g., a camera 170). For example, the guard frame 700 may further include a frame for locating the electrical object on a region adjacent to a periphery region of a second frame 730. As shown in FIG. 12, the guard frame 700 may include a seventh frame 1210 for locating the electrical object of the camera on a region adjacent to a right periphery region of the second frame 730 and an eighth frame 1230 for locating the electrical object of the sensor module on a region adjacent to a left periphery region of the second frame 730. As the seventh frame 1210 and the eighth frame 1230 are located in the regions adjacent to the periphery region of the second frame 730, they may locate the camera and the sensor module at rotation radius outer sides of propellers located on the third frames 751*m* 753, 755, and 757.

The seventh frame 1210 and the eighth frame 1230 may fail to be directly connected with a first frame 710. For example, there may be no frame which directly connects the frames between the first frame 710 and the seventh frame 1210 or the first frame 710 and the eighth frame 1230. The seventh frame 1210 and the eighth frame 1230 may be symmetric about an arrangement location and shape. Further, a weight of adding the seventh frame 1210 to the electrical object of the camera received in the seventh frame 1210 may be substantially the same as a weight of adding the eighth frame 1230 to the electrical object of the sensor module received in the eighth frame 1230. According to various embodiments, at least one of the seventh frame 1210 and the eighth frame 1230 may be configured as a segment such that the camera, the sensor module, or the like is easily combined and may include a hole for a screw or the like.

Each of the seventh frame 1210 and the eighth frame 1230 may be configured as a segment such that the camera and the sensor module are easily combined. Further, a hole for a screw or the like may be formed in the seventh frame 1210 or the eighth frame 1230.

Figure 13:
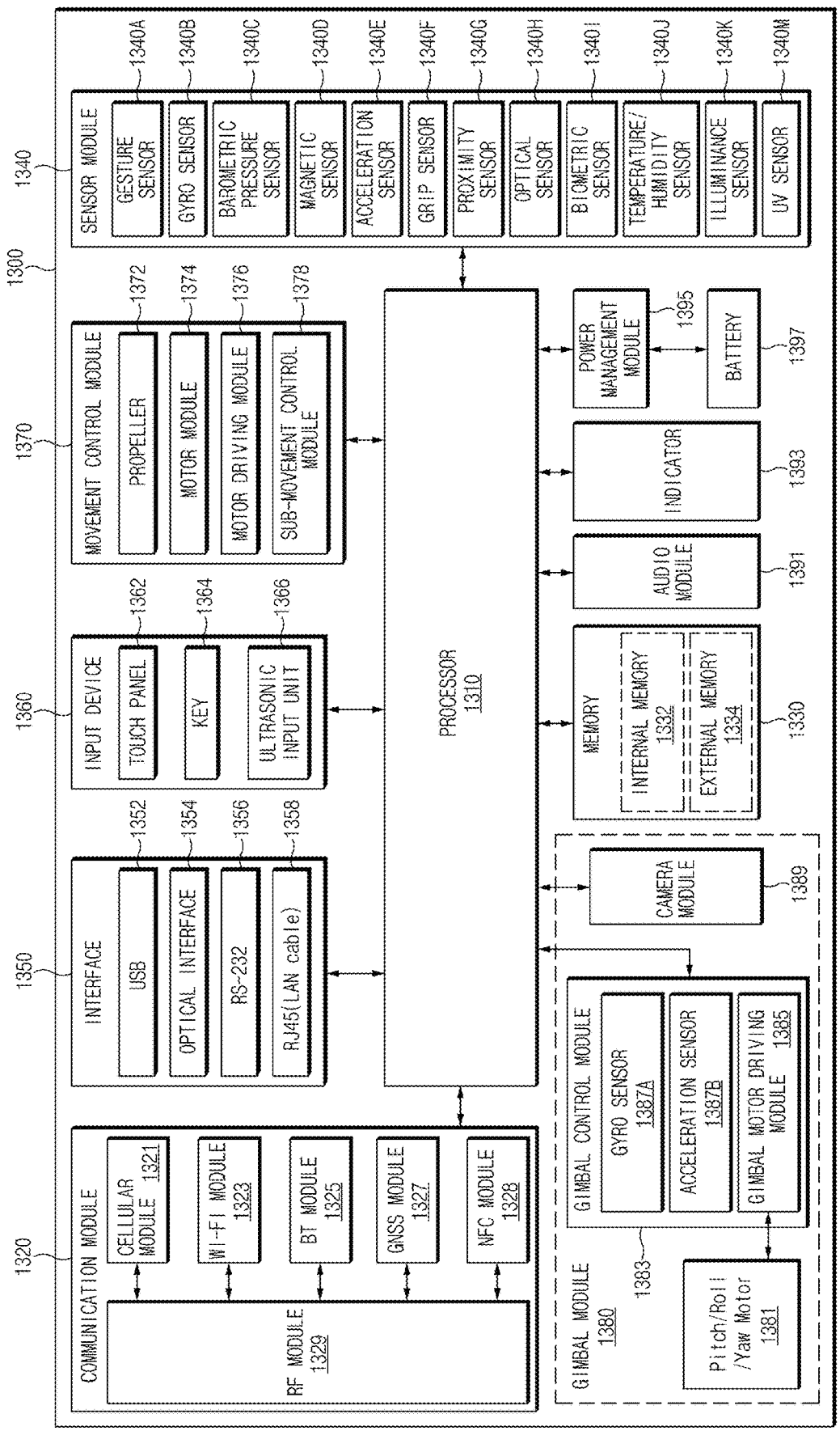
FIG. 13 illustrates a block diagram of a UAV according to various embodiments.

FIG. 13 illustrates a block diagram illustrating a UAV according to various embodiments.

Referring to FIG. 13, a UAV 1300 may include one or more processors 1310 (e.g., an application processor (AP)), a communication module 1320, an interface 1350, an input device 1360, a sensor module 1340, a memory 1330, an audio module 1391, an indicator 1393, a power management module 1395, a battery 1397, a camera module 1389, and a movement control module 1370. The UAV 1300 may further include a gimbal module 1380.

The processor 1310 may drive, for example, an operating system (OS) or an application program to control a plurality of hardware or software elements connected to the processor 1310 and may process and compute a variety of data. The processor 1310 may drive the OS and the application program to generate a flight command of the UAV 1300. For example, the processor 1310 may generate a movement command using data received from the camera module 1389 or the sensor module 1340 and the communication module 1320. The processor 1310 may calculate a relative distance of an obtained subject to generate a movement command and may generate an altitude movement command of a UAV (e.g., the UAV 1300) using vertical coordinates of the subject, thus generating a horizontal and azimuth command of the UAV using horizontal coordinates of the subject.

The communication module 1320 may include, for example, a cellular module 1321, a wireless fidelity (Wi-Fi) module 1323, a Bluetooth (BT) module 1325, a global navigation satellite system (GNSS) module 1327, a near field communication (NFC) module 1328, and a radio frequency (RF) module 1329. The communication module 1320 according to various embodiments of the present disclosure may receive a control signal of the UAV 1300 and may transmit state information and image data information of the UAV 1300 to another electronic device. The RF module 1329 may transmit and receive a communication signal (e.g., an RF signal). The RF module 1329 may include, for example, a transceiver, a power amplifier module (PAM), a frequency filter, a low noise amplifier (LNA), an antenna, or the like. The GNSS module 1327 may output location information, such as latitude, longitude, altitude, global positioning system (GPS) speed, and GPS heading during movement of the UAV 1300. The location information may be used to measure an accurate time and distance through the GNSS module 1327 and calculate a location. The GNSS module 1327 may obtain an accurate time together with three-dimensional (3D) speed information as well as latitude, longitude, and altitude. The UAV 1300 may transmit information for verifying a real-time movement state of the UAV (e.g., the UAV 1300) to another external electronic device via the communication module 1320.

The interface 1350 may be a device for inputting and outputting data with another electronic device. The interface 1350 may transmit a command or data, input from another external device, to other element(s) of the UAV 1300 using a universal serial bus (USB) or an optical interface 1354, an RS-232 1356, and an RJ45 1358. Alternatively, the interface 1350 may output a command or data, received from the other element(s) of the UAV 1300, to a user or another external device.

The input device 1360 may include, for example, a touch panel 1362, a key 1364, or an ultrasonic input unit 1366. The touch panel 1362 may use at least one of, for example, capacitive, resistive, infrared, and ultrasonic methods. Also, the touch panel 1362 may include a control circuit. The key 1364 may include, for example, a physical button, an optical key, or a keypad. The ultrasonic input device 1366 may detect an ultrasonic signal, generated from an input tool, through a microphone and may verify data corresponding to the detected ultrasonic signal. A control input of the UAV 1300 may be received through the input device 1360. For example, if a physical power key is pushed, power of the UAV 1300 may be blocked.

The sensor module 1340 may include some or all of a gesture sensor 1340A for sensing a motion and/or gesture of a subject, a gyro sensor 1340B for measuring an angular speed of the UAV (e.g., the UAV 1300), an atmospheric pressure sensor 1340C (e.g., a barometer) for measuring a change in atmospheric pressure and/or atmospheric pressure, a magnetic sensor 1340D (e.g., a geomagnetic sensor, a terrestrial magnetism sensor, or a compass sensor) for measuring an earth's magnetic field, an acceleration sensor 1340E for measuring acceleration of the UAV 1300 during flying, a grip sensor 1340F for determining a proximity state of an object or determining whether the UAV 1300 is held, a proximity sensor 1340G (including an ultrasonic sensor for measuring distance by outputting an ultrasonic signal and measuring a signal reflected from the object) for measuring distance, an optical sensor 1340H (e.g., an optical flow sensor (OFS)) for recognizing ground topography or a ground pattern and calculating a location, a biometric sensor 1340I for user authentication, a temperature/humidity sensor 1340J for measuring temperature and humidity, an illuminance sensor 1340K for measuring illuminance, or an ultraviolet (UV) sensor 1340M for measuring ultraviolet rays. The sensor module 1340 according to various embodiments may calculate an attitude of the UAV 1300. The sensor module 1340 may share attitude information of the UAV 1300 with the movement control module 1370.

The memory 1330 may include an internal memory 1332 or an external memory 1334. The memory 1330 may store a command or data associated with at least one other element(s) of the UAV 1300. The memory 1330 may store software and/or a program. The program may include a kernel, middleware, an application programming interface (API), an application program (or an application), and/or the like.

The audio module 1391 may convert, for example, a sound and an electric signal in dual directions. The audio module 1391 may include a speaker and a microphone and may process input or output sound information.

The indicator 1393 may display a specific state of the UAV 1300 or part of the UAV 1300 (e.g., the processor 1310), for example, an operation state, a charging state, or the like. Alternatively, the indicator 1393 may display a flight state or an operation mode of the UAV 1300.

The power management module 1395 may manage, for example, power of the UAV 1300. The power management module 1395 may include a power management integrated circuit (PMIC), a charger IC, or a battery (or fuel) gauge. The PMIC may have a wired charging method and/or a wireless charging method. The wireless charging method may include, for example, a magnetic resonance method, a magnetic induction method, an electromagnetic method, or the like and may further include an additional circuit for wireless charging, for example, a coil loop, a resonant circuit, a rectifier, or the like. The battery gauge may measure, for example, a remaining capacity of the battery 1397 and a voltage, current or temperature thereof while the battery 1397 is charged.

The battery 1397 may include, for example, a rechargeable battery.

The camera module 1389 may be included in the UAV 1300. Alternatively, if the UAV 1300 includes the gimbal module 1380, the camera module 1389 may be included in the gimbal module 1380. The camera module 1389 may include a lens, an image sensor, an image processing unit, or a camera controller. The camera controller may adjust up, down, left, and right angles of a camera lens based on composition information and/or camera control information output from the processor 1310 to adjust a composition of a subject and/or a camera angle (an image capture angle). The image sensor may include a row driver, a pixel array, a column driver, and the like. The image processing unit may include an image preprocessing unit, an image post-processing unit, a still image codec, a moving image codec, and the like. The image processing unit may be included in the processor 1310. The camera controller may control focusing, tracking, and the like.

The camera module 1389 may perform an image capture operation in an image capture mode. A predetermined part of the camera module 1389 may be influenced by motion of the UAV 1300. The camera module 1389 may be located in the gimbal module 1380 to minimize a change in image capture of the camera module 1389 according to motion of the UAV 1300.

The movement control module 1370 may control an attitude and movement of the UAV 1300 using location and attitude information of the UAV 1300. The movement control module 1370 may control roll, pitch, yaw, throttle, or the like of the UAV 1300 depending on obtained location and attitude information. The movement control module 1370 may control autonomous flight based on a hovering flight operation and an autonomous flight command (e.g., a distance and altitude movement horizontal and azimuth command or the like) provided to the processor 1310 and may control a flight operation based on a received user input command. For example, if a movement module is a quadcopter, the movement control module 1370 may include a plurality of sub-movement control modules 1378 (e.g., a microprocessor unit (MPU)), a motor driving module 1376, a motor module 1374, and a propeller 1372. The sub-movement control module 1378 (e.g., the MPU) may output control data for rotating the propeller 1372 in response to controlling a flight operation. The motor driving module 1376 may convert motor control data corresponding to an output of the sub-movement control module 1378 into a driving signal and may output the driving signal. The motor module 1374 (or a motor) may control rotation of the propeller 1372 based on a driving signal of the motor driving module 1376.

The gimbal module 1380 may include, for example, a gimbal control module 1383, a gyro sensor 1387A, an acceleration sensor 1387B, a gimbal motor driving module 1385, and a motor 1381. The camera module 1389 may be included in the gimbal module 1380.

The gimbal module 1380 may generate compensation data according to motion of the UAV 1300. The compensation data may be data for controlling at least part of pitch or roll of the camera module 1389. For example, the roll and pitch motor 1381 may compensate roll and pitch of the camera module 1389 depending on motion of the UAV 1300. The camera module 1389 may be mounted on the gimbal module 1380, and the gimbal module 1380 may offset motion by rotation (e.g., pitch and roll) of the UAV 1300 (e.g., a multicoper) to stabilize the camera module 1389 in a correct stand state. The gimbal module 1380 may capture a stable image to maintain the camera module 1389 at a predetermined tilt irrespective of motion of the UAV 1300. The gimbal control module 1383 may include a sensor module including the gyro sensor 1387A and the acceleration sensor 1387B. The gimbal control module 1383 may analyze a value measured by a sensor including the gyro sensor 1387A and the acceleration sensor 1387B to generate a control signal of the gimbal motor driving module 1385 and may drive the motor 1381 of the gimbal module 1380.

Figure 14:
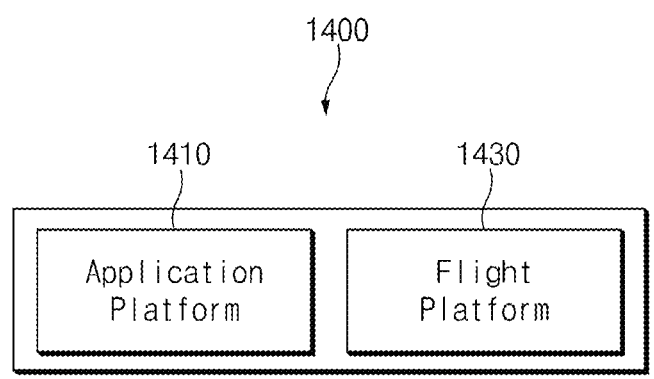
FIG. 14 illustrates a block diagram of a platform of a UAV according to various embodiments.

FIG. 14 illustrates a block diagram of a platform of a UAV according to various embodiments.

Referring to FIG. 14, a UAV 1400 may include an application platform or a flight platform. The UAV 1400 may include at least one or more of the application platform 1410 for wirelessly interworking to receive a control signal, driving the UAV 1400, and providing a service, the flight platform 1430 for controlling flight depending on a navigation algorithm, or the like.

The application platform 1410 may perform communication control (e.g., connectivity), image control, sensor control, or charging control of elements of the UAV 1400, a change in operation according to a user application, or the like. The application platform 1410 may be executed by a processor. The flight platform 1430 may execute flight, attitude control, or a navigation algorithm of the UAV 1400. The flight platform 1430 may be executed by the processor or a movement control module. The application platform 1410 may transmit a control signal to the flight platform 1430 while performing communication control, image control, sensor control, charging control, or the like.

The processor may obtain an image in which a subject is captured by a camera module. The processor may analyze the obtained image to generate a command for controlling flight of the UAV 1400. For example, the processor may generate size information of an obtained subject, a movement state of the subject, a relative distance and altitude between an image capture device and the subject, and azimuth information. The processor may generate a following flight control signal of the UAV 1400 using the generated information. The flight platform 1430 may control a movement control module based on a received control signal such that the UAV 1400 flies (to control altitude and movement of the UAV 1400).

According to various embodiments, the processor may measure a location, a flight attitude, an attitude angular speed, acceleration, or the like of the UAV 1400 through a GPS module or a sensor module. Output information of the GPS module and the sensor module may be generated and may be basic information of a control signal for navigation/automatic control of the UAV 1400. Information of an atmospheric pressure for measuring an altitude through an atmospheric pressure difference according to flight of the UAV (e.g., the UAV 1400) and information about ultrasonic sensors for measuring an accurate altitude at a low altitude may be used as basic information. In addition, a control data signal received from a remote controller, battery state information of the UAV 1400, or the like may be used as basic information of a control signal.

The UAV 1400 may fly using, for example, one or more propellers. The propeller may change torque of a motor to momentum. The UAV 1400 may be referred to as a quadcopter if the number of rotors (propellers) is 4, may be referred to as a hexacopter if the number of rotors (propellers) is 6, and may be referred to as an octocopter if the number of rotors (propellers) is 8.

The UAV 1400 may control a propeller based on a received control signal. The UAV 1400 may fly based on two principles of lift/torque. The UAV 1400 may rotate a half of multiple propellers in a clockwise direction for rotation and may rotate the other half in a counterclockwise direction for rotation. 3D coordinates according to flight of the UAV 1400 may be determined by pitch Y/roll X/yaw Z. The UAV 1400 may fly by tilting back and forth/right and left. If tilting the UAV 1400, flow of air generated by a propeller module (a rotor) may be changed in direction. For example, if the UAV 1400 is tilted forward, air may go backward slightly as well as flowing up and down. Thus, a fuselage may go forward according to the law of action/reaction as much as an air space is pushed backward. A method for tilting the UAV 1400 may be performed by decreasing a speed of a front of a corresponding direction and increasing a speed of a rear of the corresponding direction. Since this method is common to all directions, the UAV 1400 may be tilted and moved by adjusting only a speed of a motor module (or a rotor).

As the flight platform 1430 of the UAV 1400 receives a control signal generated by the application platform 1410 and controls the motor module, the UAV 1400 may perform flight control according to attitude control and a movement path of pitch Y/roll X/yaw Z of the UAV 1400.

As described above, according to various embodiments, an unmanned aerial vehicle (UAV) may include a first guard grill, a second guard grill configured to be removably combined with the first guard grill and form an external structure and an inner space of the UAV with the first guard grill, a housing configured to include a central portion located in the center of the inner space and embed a processor and a navigation system, one or more propelling elements configured to be located the inner space and be disposed around the central portion, and a plurality of motor assemblies configured to be located in the inner space and drive the propelling elements while being electrically connected with the processor. When viewed from the outside of the external structure, the propelling elements may be partially covered by at least one of the first guard grill or the second guard grill.

According to various embodiments, the UAV may further include a first assembly configured to include a camera. The first assembly may be located in a first peripheral portion of the external structure.

According to various embodiments, the UAV may further include a second assembly configured to include at least one sensor. The second assembly may be located in a second peripheral portion of the external structure, the second peripheral portion being opposite to the first peripheral portion with respect to the central portion.

According to various embodiments, the first assembly may have substantially the same weight as the second assembly.

According to various embodiments, the UAV may further include a plurality of connection rods. Each of the plurality of connection rods may connect the central portion to one of the motor assemblies.

According to various embodiments, the propelling elements may include a first propeller configured to rotate in a first rotation direction about a first axis extended in a first direction, a second propeller configured to rotate in a second rotation direction, opposite to the first rotation direction, about a second axis parallel to the first axis, a third propeller configured to rotate in the first rotation direction about a third axis parallel to the first axis, and a fourth propeller configured to rotate in the second rotation direction about a fourth axis parallel to the first axis. The first propeller and the third propeller may be located to be symmetrical about the central portion, and the second propeller and the fourth propeller may be located to be symmetrical about the central portion.

According to various embodiments, the first rotation direction may be a clockwise direction, and the second rotation direction may be a counterclockwise direction.

According to various embodiments, the plurality of motor assemblies may include a first motor assembly configured to drive the first propeller, a second motor assembly configured to drive the second propeller, a third motor assembly configured to drive the third propeller, and a fourth motor assembly configured to drive the fourth propeller, and the plurality of connection rods may include a first rod configured to be connected between a first portion of the central portion and the first motor assembly, a second rod configured to be connected between a second portion of the central portion and the second motor assembly, a third rod configured to be connected between a third portion of the central portion and the third motor assembly, and a fourth rod configured to be connected between a fourth portion of the central portion and the fourth motor assembly.

According to various embodiments, the first rod may have a first length which is longer than the shortest distance between the first portion of the central portion and the first motor assembly.

According to various embodiments, when viewed from the top of the first propeller, the first rod may be extended in a different direction from a virtual first straight line extended between the first portion of the central portion and the first axis.

According to various embodiments, when viewed from the top of the first propeller, the first rod may include one end connected with one point of the first motor assembly and forms about 90 degrees with a virtual second straight line extended from the one point of the first motor assembly to the first axis.

According to various embodiments, when viewed from the central portion, the one point of the first motor assembly may be located at a left side with respect to the first straight line.

According to various embodiments, the second rod may have the first length. When viewed from the top of the second propeller, the second rod may be extended in a different direction from a virtual third straight line extended between the second portion of the central portion and the second axis. When viewed from the top of the second propeller, the second rod may include one end connected with one point of the second motor assembly. When viewed from the top of the second propeller, the second rod may form about 90 degrees with a virtual fourth straight line extended from the one point of the second motor assembly to the second axis. When viewed from the central portion, the one point of the second motor assembly may be located at a right side with respect to the third straight line.

According to various embodiments, the third rod may have the first length. When viewed from the top of the third propeller, the third rod may be extended in a different direction from a virtual fifth straight line extended between the third portion of the central portion and the third axis. When viewed from the top of the third propeller, the third rod may include one end connected with one point of the third motor assembly. When viewed from the top of the third propeller, the third rod may form about 90 degrees with a virtual sixth straight line extended from the one point of the third motor assembly to the third axis. When viewed from the central portion, the one point of the third motor assembly may be located at a left side with respect to the fifth straight line.

According to various embodiments, the fourth rod may have the first length. When viewed from the top of the fourth propeller, the fourth rod may be extended in a different direction from a virtual seventh straight line extended between the fourth portion of the central portion and the fourth axis. When viewed from the top of the fourth propeller, the fourth rod may include one end connected with one point of the fourth motor assembly. When viewed from the top of the fourth propeller, the fourth rod may form about 90 degrees with a virtual eighth straight line extended from the one point of the fourth motor assembly to the fourth axis. When viewed from the central portion, the one point of the fourth motor assembly may be located at a right side with respect to the seventh straight line.

As described above, according to various embodiments, an unmanned aerial vehicle (UAV) may include a guard frame configured to form the appearance of the UAV and have a space formed at an inner side of the guard frame, a housing configured to be located in the space, the housing in which at least one of a processor, a memory, a communication circuit, or a battery is received, a plurality of motors configured to be located in the space and be electrically connected with the processor, and one or more propellers configured to be located in the space and be driven by the plurality of motors. The guard frame may include a first frame configured to be located in a central region of the guard frame, the first frame in which the housing is received, a second frame configured to be located at an outer side of the first frame and surround the first frame, a plurality of third frames configured to be located between the first frame and the second frame, the plurality of third frames in which the plurality of motors are received, at least one fourth frame configured to connect the first frame with one of the plurality of third frames, and at least one fifth frame configured to connect the second frame with one of the plurality of third frames. At least one of the fourth frame and the fifth frame may be extended from one point of an outer surface of one frame among the plurality of third frames while forming a specified angle with a first straight line which virtually connects a central point of the one frame with the one point of the outer surface.

According to various embodiments, the specified angle may be 60 degrees to 120 degrees.

According to various embodiments, if a rotation direction of a motor received in the one frame is a clockwise direction, at least one of the fourth frame and the fifth frame may be extended in a left direction of the first straight line, and if the rotation direction of the motor is a counterclockwise direction, the at least one of the fourth frame and the fifth frame may be extended in a right direction of the first straight line.

According to various embodiments, the fourth frame may be formed to be shorter in length than a length from a central point of the one frame to a point where the fourth frame is connected with the first frame.

According to various embodiments, the fifth frame may be formed to be shorter in length than a length from a central point of the one frame to a point where the fifth frame is connected with the second frame.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor, the processor may perform functions corresponding to the instructions.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An unmanned aerial vehicle (UAV), comprising:
a first guard grill;
a second guard grill configured to be removably combined with the first guard grill and form an external structure and an inner space of the UAV with the first guard grill;
a housing including a central portion located in a center of the inner space and embedding a processor and a navigation system;
a plurality of propelling elements located in the inner space and disposed around the central portion, the plurality of propelling elements including a first propeller, a second propeller, a third propeller, and a fourth propeller;
a plurality of motor assemblies electrically connected with the processor and located in the inner space and drive the plurality of propelling elements; and
a plurality of connection rods including a first rod, a second rod, a third rod, and a fourth rod, each of the plurality of connection rods connecting the central portion to one of the plurality of motor assemblies,
wherein, when viewed from the outside of the external structure, the plurality of propelling elements is partially covered by at least one of the first guard grill or the second guard grill,
wherein the plurality of motor assemblies includes:
a first motor assembly configured to drive the first propeller to rotate in a clockwise direction about a first axis extended in a first direction;
a second motor assembly configured to drive the second propeller to rotate in a counterclockwise direction about a second axis parallel to the first axis;
a third motor assembly configured to drive the third propeller rotate in the clockwise direction about a third axis parallel to the first axis, the third propeller being symmetrically located to the first propeller about the central portion; and
a fourth motor assembly configured to drive the fourth propeller rotate in the counterclockwise direction about a fourth axis parallel to the first axis, the fourth propeller being symmetrically located to the second propeller about the central portion, and
wherein the first rod has a first length that is longer than a shortest distance between a first portion of the central portion and the first motor assembly.

2. The UAV of claim 1, further comprising:
a first assembly configured to include a camera, wherein the first assembly is located in a first peripheral portion of the external structure.

3. The UAV of claim 2, further comprising:
a second assembly configured to include at least one sensor,
wherein the second assembly is located in a second peripheral portion of the external structure, the second peripheral portion being opposite to the first peripheral portion with respect to the central portion.

4. The UAV of claim 3, wherein the first assembly has substantially a same weight as the second assembly.

5. The UAV of claim 1, wherein, when viewed from a top of the first propeller, the first rod is extended in a different direction from a virtual first straight line extended between the first portion of the central portion and the first axis.

6. The UAV of claim 5, wherein, when viewed from the top of the first propeller, the first rod includes one end connected with one point of the first motor assembly and forms a right angle with a virtual second straight line extended from the one point of the first motor assembly to the first axis.

7. The UAV of claim 6, wherein, when viewed from the central portion, the one point of the first motor assembly is located at a left side with respect to the first straight line.

8. The UAV of claim 7, wherein the second rod has the first length,
wherein, when viewed from the top of the second propeller, the second rod is extended in a different direction from a virtual third straight line extended between a second portion of the central portion and the second axis,
wherein, when viewed from the top of the second propeller, the second rod includes one end connected with one point of the second motor assembly,
wherein, when viewed from the top of the second propeller, the second rod forms a right angle with a virtual fourth straight line extended from the one point of the second motor assembly to the second axis, and
wherein, when viewed from the central portion, the one point of the second motor assembly is located at a right side with respect to the third straight line.

9. The UAV of claim 8, wherein the third rod has the first length,
wherein, when viewed from the top of the third propeller, the third rod is extended in a different direction from a virtual fifth straight line extended between a third portion of the central portion and the third axis,
wherein, when viewed from the top of the third propeller, the third rod includes one end connected with one point of the third motor assembly,
wherein, when viewed from the top of the third propeller, the third rod forms a right angle with a virtual sixth straight line extended from the one point of the third motor assembly to the third axis, and
wherein, when viewed from the central portion, the one point of the third motor assembly is located at a left side with respect to the fifth straight line.

10. The UAV of claim 9, wherein the fourth rod has the first length,
wherein, when viewed from the top of the fourth propeller, the fourth rod is extended in a different direction from a virtual seventh straight line extended between a fourth portion of the central portion and the fourth axis,
wherein, when viewed from the top of the fourth propeller, the fourth rod includes one end connected with one point of the fourth motor assembly, wherein, when viewed from the top of the fourth propeller, the fourth rod forms a right angle with a virtual eighth straight line extended from the one point of the fourth motor assembly to the fourth axis, and wherein, when viewed from the central portion, the one point of the fourth motor assembly is located at a right side with respect to the seventh straight line.

\* \* \* \* \*